United States Patent
Nephew et al.

(10) Patent No.: US 8,121,885 B2
(45) Date of Patent: Feb. 21, 2012

(54) PLAN SOLVER

(75) Inventors: Jill Nephew, Sebastopol, CA (US); Wei Cui, San Ramon, CA (US); Walter Romijn, Pleasanton, CA (US); Gregory Penn, Lakewood, CA (US)

(73) Assignee: Oracle International Corporation, Redwood Shores, CA (US)

( * ) Notice: Subject to any disclaimer, the term of this patent is extended or adjusted under 35 U.S.C. 154(b) by 376 days.

(21) Appl. No.: 12/422,515

(22) Filed: Apr. 13, 2009

(65) Prior Publication Data

US 2009/0198687 A1 Aug. 6, 2009

Related U.S. Application Data

(62) Division of application No. 10/394,831, filed on Mar. 21, 2003, now Pat. No. 7,552,067.

(51) Int. Cl.
*G06F 17/30* (2006.01)

(52) U.S. Cl. .................................................. 705/7.31

(58) Field of Classification Search .............. 705/7.31
See application file for complete search history.

(56) References Cited

U.S. PATENT DOCUMENTS 6,151,582 A * 11/2000 Huang et al. ............... 705/7.25

OTHER PUBLICATIONS

Stephen "Supply Chain Operations Reference Model Version 5.0: A New Tool to Improve Supply Chain Efficiency and Achieve Best Practice", Dec. 2001, Springer Netherlands, pp. 1-6.*
Li et al "Customer demand satisfaction in production systems: a due-timeperformance approach", Aug. 2001, Robotics and Automation, IEEE Transactions on, pp. 1-11.*
Murth (Supply Chain Management in the Computer Industry), Apr. 2000, Department of Industrial and Operations Engineering, pp. 1-16.*

* cited by examiner

*Primary Examiner* — Romain Jeanty
(74) *Attorney, Agent, or Firm* — Kilpatrick Townsend & Stockton LLP

(57) ABSTRACT

Systems and methods for supply chain management and identification of feasible plans. Identification of feasible plans includes simultaneous breadth and depth satisfaction of demands. Demands are satisfied using multiple sources of supply, consideration of substitute items, generation of supply, and/or reallocation of supply previously pegged for satisfaction of a lower priority demand. Reallocation optionally includes consideration of items and demands associated with multiple level codes.

12 Claims, 5 Drawing Sheets

PLAN SOLVER

CROSS-REFERENCES TO RELATED APPLICATIONS

The present patent application is a divisional application of U.S. Ser. No. 10/394,831, now U.S. Pat. No. 7,552,067, entitled "System and Method Supply Chain Demand Satisfaction [As Amended]" filed Mar. 21, 2003, and is hereby incorporated by reference herein in its entirety, for all purposes.

BACKGROUND

1. Field of the Invention

The invention is in the field of computer systems for business management and more specifically in the field of supply chain management.

2. Prior Art

Supply chain management, whether for production, consumption, or sales, can be an important aspect of business processes. The use of just-in-time inventory and other cost control systems have lead to the development of specialized software for supply chain management. Some software systems include mathematical approaches, such as stochastic optimization, designed to maximize business objectives. Other software systems include rule-based systems to plan resolution of demands for supply. One goal of these systems is often to devise a feasible plan for satisfying expected demands. However, existing systems have not kept pace with a desire for more sophisticated decision making tools.

SUMMARY OF THE INVENTION

The present invention includes systems and methods of supply chain planning. Demand requirements are modeled using an item relationship structure having both breadth and depth. The breadth of a level is determined by a number of items that are assigned a level code associated with that level. The depth is determined by a number of levels used to represent components (e.g., individual sub-items or subassemblies) within the structure. Using a solution system that includes both depth and breadth searches a variety of advantages are achieved over the prior art. For example, in various embodiments some depth and breadth searches are configured to have different goals and/or restraints. In some embodiments a recursive approach is used to search through various levels.

Various embodiments of the invention include a method of satisfying a demand, the method comprising collecting demands for one or more items, the one or more items having the same level code, and for each of the collected demands, determining a first demand shortage quantity, looking for available unpegged supply responsive to the first demand shortage quantity, determining a second demand shortage quantity, and creating supply, the creation of supply being responsive to the second demand shortage quantity and the creation of supply, including satisfying a dependent demand at a higher level code.

Various embodiments of the invention include a method of solving a demand, the method comprising collecting a plurality of first demands for items, the first demands being associated with items having a zero level code, generating dependent demands configured for generating supply responsive to a shortage quantity, the dependent demands being associated with items having a level code greater than zero, and satisfying the dependent demands during satisfaction of the first demands.

Various embodiments of the invention include a method of solving a demand, the method comprising collecting a first demand for an item, the first demand having a level code, generating a dependent demand configured for generating supply responsive to a shortage quantity of the first demand, the dependent demand having a different level code than the first demand, and satisfying the dependent demand, the satisfaction being responsive to a comparison between priorities of the dependent demand and the first demand.

Various embodiments of the invention include a computing system for determining a feasible supply plan, the system including a data storage the data storage being configured to store a plurality of item definitions, a plurality of demand data, and a plurality of supply data, the plurality of item definitions including component data configured for the generation of dependent demands, the generation occurring during satisfaction of demands for items defined by the item definitions, and a processor configured to access the data storage.

Various embodiments of the invention include a computer readable medium having embodied thereon data, the data comprising computer code configured for collecting demands for one or more items, the one or more items having the same level code, and for each of the collected demands, selecting the demand, determining a first demand shortage quantity, looking for available unpegged supplies responsive to the first demand shortage quantity, determining a second demand shortage quantity, and creating supply, the creation of supply being responsive to the second demand shortage quantity and the creation of supply including satisfying a dependent demand at a higher level code.

BRIEF DESCRIPTION OF THE VARIOUS VIEWS OF THE DRAWING

DETAILED DESCRIPTION OF THE INVENTION

The present invention includes systems and methods for determining feasible plans for the allocation of supplies and the satisfaction of demand requirements. In typical embodiments, searches for feasible plans include both depth and breadth searches and solutions. Different phases of a search are optionally responsive to rule based and/or mathematical optimization algorithms. For example, demand requirements for a subassembly may be solved using a rule based approach while optimum allocation of a limited resource may be solved using a linear optimization routine.

Feasible plans are determined using data representing relationships between items for which there may be a demand, and components of those items. For example, in one embodiment, this data includes a bill of materials specifying all of the components required to supply a computer. Each component, such as a keyboard or display, is optionally characterized by further data specifying all of the subcomponents required to supply that component. Using this approach, many levels of components and subcomponents can be defined. Generally, each item is assigned a "level code," indicating the level of components to which the item belongs. Typically, the top level is associated with the final "complete" item and is assigned the lowest level code (zero). Higher level codes are assigned to items within each level of components.

Figure 1:
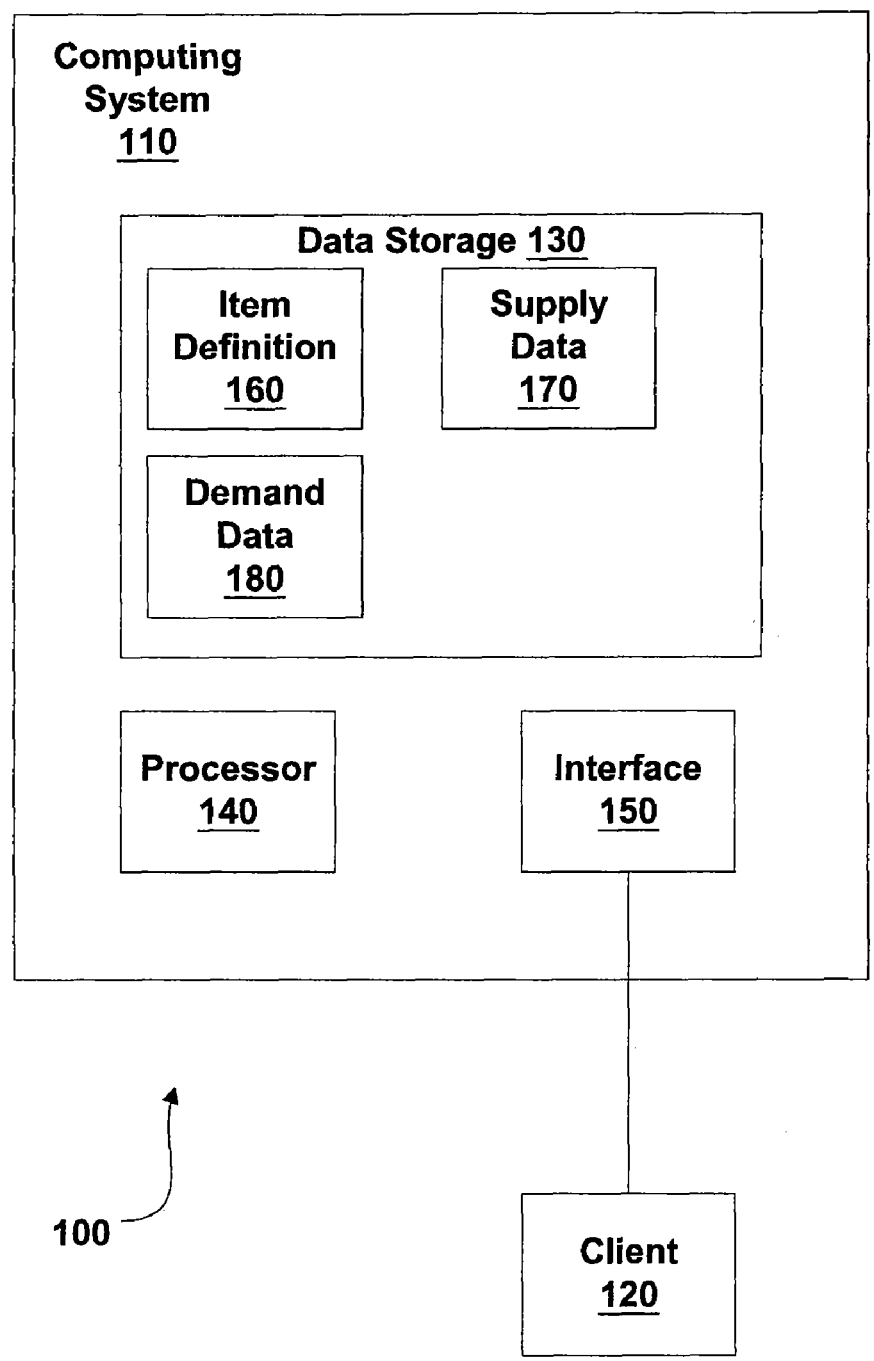
FIG. 1 is a block diagram illustrating a plan solving system according to various embodiments of the invention.

FIG. 1 is a block diagram illustrating a Plan Solving System, generally designated 100, according to various embodiments of the invention. Plan Solving System 100 includes a Computing System 110 and an optional Client 120. Client 120 is a computing device, terminal or other access system, and is optionally connected to Computing System 110 through a computer network such as a local area network, the Internet, or the like. Computing System 110 is a single computing device or a set of devices such as a distributed computing system. In a typical embodiment Computing System 110 includes a Data Storage 130, a Processor 140, and an optional Interface 150.

Processor 140 is typically a data processor, integrated circuit or similar device configured to execute methods of the invention and to manage access to Data Storage 130. Interface 150 is configured for communication with Client 120 or other computing devices.

Data Storage 130 is configured to store data used in determining a feasible plan. These data include Item Definition Data 160, Supply Data 170, and Demand Data 180. Item Definition Data 160 includes information about an item for which there may be a demand. This information typically includes an item identifier, possible sources for the item, ways in which supply of the item may be generated, cost of the item, or the like. In some cases, sources for an item include both vendors who may supply the item and means of producing the item. For example, in some embodiments, Item Definition Data 160 includes a computer item and components of the computer item such as a DVD-ROM drive and a display. In these embodiments each component is also an item characterized by Item Definition Data 160. Therefore, Item Definition Data 160 may further include a source for purchasing the DVD-ROM drive and a list of items required to assemble the display. In this example, the computer may be assigned a level code of zero and the DVD-ROM drive and display may be assigned a level code of one. Typically, Item Definition Data 160 will include further components at higher level codes, as required to solve demands.

Supply Data 170 includes information about the supply of items defined in Item Definition Data 160. For example, in various embodiments, Supply Data 170 includes the quantities of items stored at various locations, the lead times required to obtain an item from various sources, historic demand for items, quantities of items already pegged (allocated) to meet demands, amount of an item scheduled to become available, or the like.

Demand Data 180 includes expected future demand for an item, satisfied demand, total current demand, demand not yet satisfied, or the like. Demands are optionally associated with a user defined time frame. Examples of demands include custom orders, quoted orders, component (dependent) demand, transferred demand, projected demand, and the like.

Figure 2:
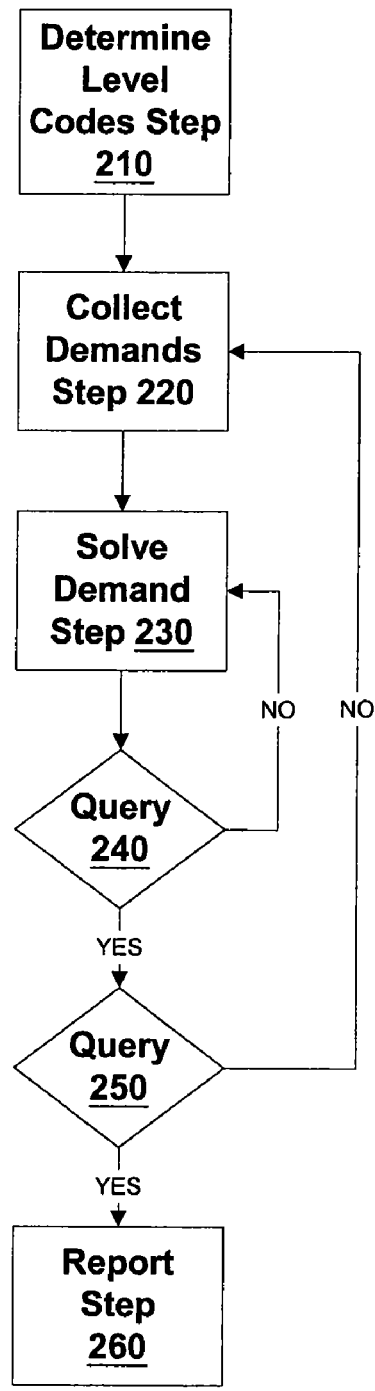
FIG. 2 is a flow diagram illustrating a feasible plan search according to various embodiments of the invention.

FIG. 2 is a flow diagram illustrating a feasible plan search according to various embodiments of the invention. One use of the feasible plan search is to identify a resource allocation plan that satisfies current and/or expected demands. The search includes resolving demand of items at a given level code. When satisfaction of demand for a particular item includes generation of that item, the search for a feasible plan optionally includes satisfaction of demands for components of that particular item. Thus, in some embodiments, a search can include breadth across items of a particular code level and also depth through various levels of an item's components.

In a Determine Level Codes Step 210, a range of level codes included in Item Definition 160 is determined. This range begins at level code zero and includes the maximum level code that could be used to resolve demand for items of interest. The maximum level code used in a search is optionally a user settable value. Steps 220 through 240 (discussed further below) are repeated for each level code value in this range, starting at level code zero and proceeding through the maximum level code.

In a Collect Demands Step 220, demands for items with the current level code (n) are collected. In Collect Demands Step 220, these demands are optionally sorted by start time or other factors determining demand priority. For example, in one embodiment level code zero includes demands for custom computers ordered by customers. In the first execution of Collect Demands Step 220 level code zero demands are collected. In some embodiments, the collected demands are sorted by an expected shipping date, priority, predictability, or the like.

In a Solve Demand Step 230, the demands collected and optionally sorted in Collect Demands Step 220 are satisfied, if possible. In satisfying the demand for a particular item, Solve Demand Step 230 optionally includes satisfying demands for components of that particular item, as explained more fully herein. Thus, during the process of satisfying demands at the current level code n, some demands, at level codes greater than n, are also resolved, if possible. In some embodiments, this depth-breath approach to demand satisfaction allows identification of feasible plans including consideration of items at multiple level codes. This consideration optionally includes varying priorities and/or optimization models. For example, in an embodiment wherein instances of the same item, say a resister, are found in level code two and level code three, demand for each instance may be resolved in Solve Demand Step 230. If the instance of the resister at level code three is part of a subassembly having greater priority than the instance of the resister at level two, then the instance at level three may be given preference in searching for a feasible plan. Priority is determined, for example, by a user or by inheritance of priority from related demands at lower level codes. For example, in some embodiments, a priority of a demand for an item is used to determine a priority of a demand for a component of that item. Further details of Solve Demand Step 230 are illustrated herein.

A Query Step 240 is used to determine if Solve Demand Step 230 has been executed for all demands at the current level code n. If not, then the method returns to execute Solve Demand Step 230 to attempt to satisfy the next demand in the sorted order. If Solve Demand Step 230 has been executed for all demands at the current level code n then a Query Step 250 is used to determine if Solve Demand Step 230 has been executed for all demands at all levels. If not, then the current level code n is incremented and the method returns to Collect Demands Step 220. If Solve Demand Step 230 has been executed for all demands at all levels, then a Report Step 260 is optionally performed. If a feasible plan has been found, then in Report Step 260 this plan is optionally reported to a user. Alternatively, if a feasible plan has not been found then Report Step 260 includes reporting any unresolved demands to the user.

Figure 3:
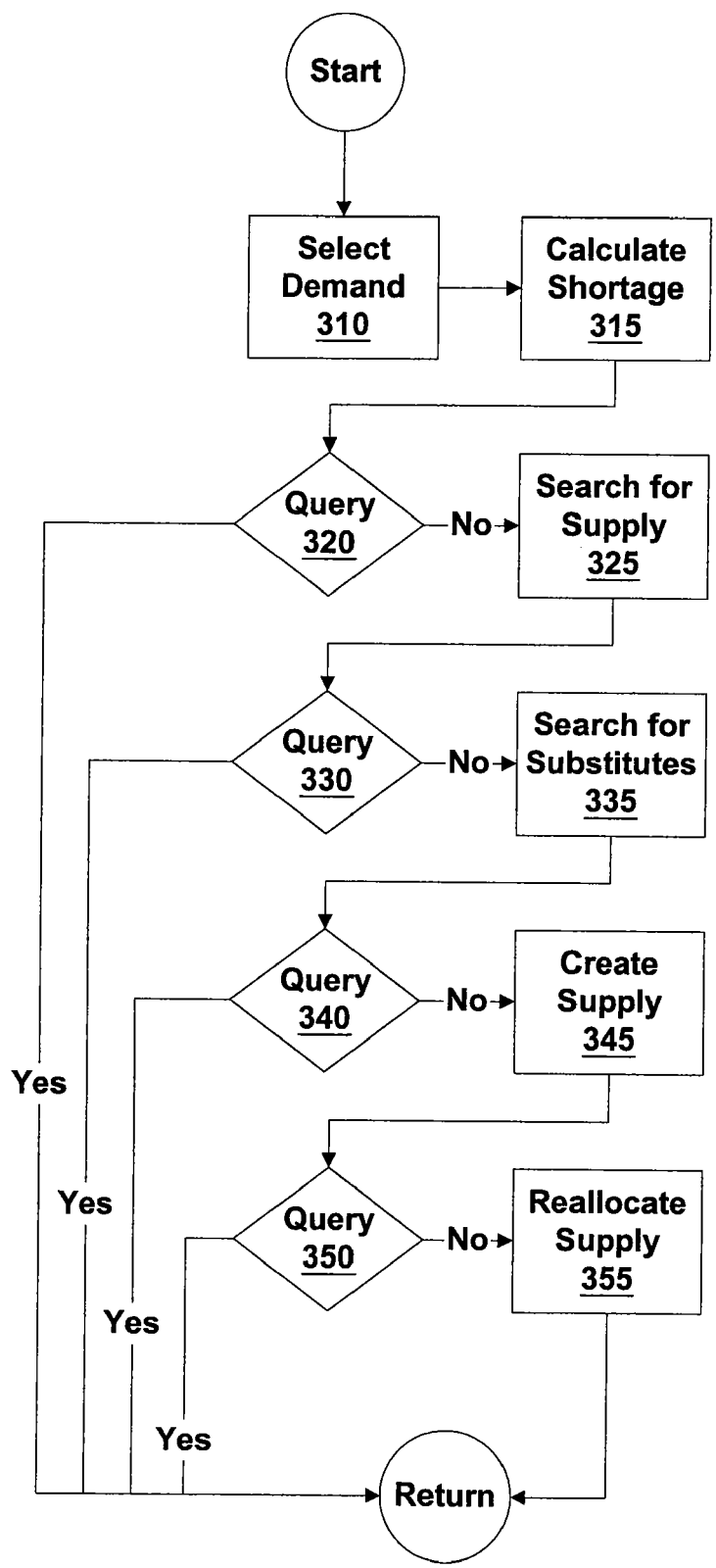
FIG. 3 is a flow diagram illustrating a method of solving one or more demands according to various embodiments of the invention.

FIG. 3 is a flow diagram illustrating a method of solving one or more demands according to various embodiments of the invention. This method is included in some embodiments of Solve Demand Step 230 (FIG. 2). In a Select Demand Step 310, a demand is retrieved from Demand Data 180. The retrieved data includes information about the item in demand, a quantity of the demand, a quantity of the demand already satisfied by allocation of supply, demand priority, or the like. In a Calculate Shortage Step 315, the quantity of the demand and the quantity of the demand already satisfied are used to calculate a shortage quantity. In a Query Step 320 the shortage quantity is examined. If the shortage quantity is zero (or less) then there is no need to further peg supply to the demand retrieved in Select Demand Step 310. The method then returns to the step, such as Solve Demand Step 230, that initiated the process of FIG. 3. If the shortage quantity, as determined in Query Step 320, is greater than zero, then the method proceeds to an optional Search for Supply Step 325.

In Search for Supply Step 325, Supply Data 170 is examined for unpegged supplies that can be used to satisfy the demand. In some embodiments, the search for unpegged supplies includes consideration of proximity to a location of the demand. For example, in one embodiment the closest supply is considered first. In other embodiments, factors such as supply cost, supply reliability, or the like, are considered. Typically, for a supply to be pegged (e.g., allocated to satisfy a demand), the availability of the supply must be on or before any demand requirement date. Any found supply is pegged to the demand until the demand is satisfied. Unpegged supplies optionally include those that are available to be purchased from a supplier. Supply available from a supplier can become pegged once ordered and associated with a delivery date. The shortage quantity is adjusted by any supply pegged in Search for Supply Step 325.

In a Query Step 330, the shortage quantity is again examined. If the shortage quantity is zero then there is no need to further resolve the demand retrieved in Select Demands Step 310. The method then returns to the step that initiated the process of FIG. 3. If the shortage quantity, as determined in Query Step 330, is greater than zero, then the method proceeds to an optional Search for Substitutes Step 335.

In Search for Substitutes Step 335, Supply Data 170 is examined for unpegged alternative supplies that can be used to satisfy the demand. Acceptable alternatives to a particular item are optionally included in Item Definition 160. As in Search for Supply Step 325, found supply is used to satisfy the demand, and as in Query Step 330, a Query Step 340 is used to determine if the demand is completely satisfied. If the shortage is still greater than zero then the method proceeds to an optional Create Supply Step 345.

Figure 4:
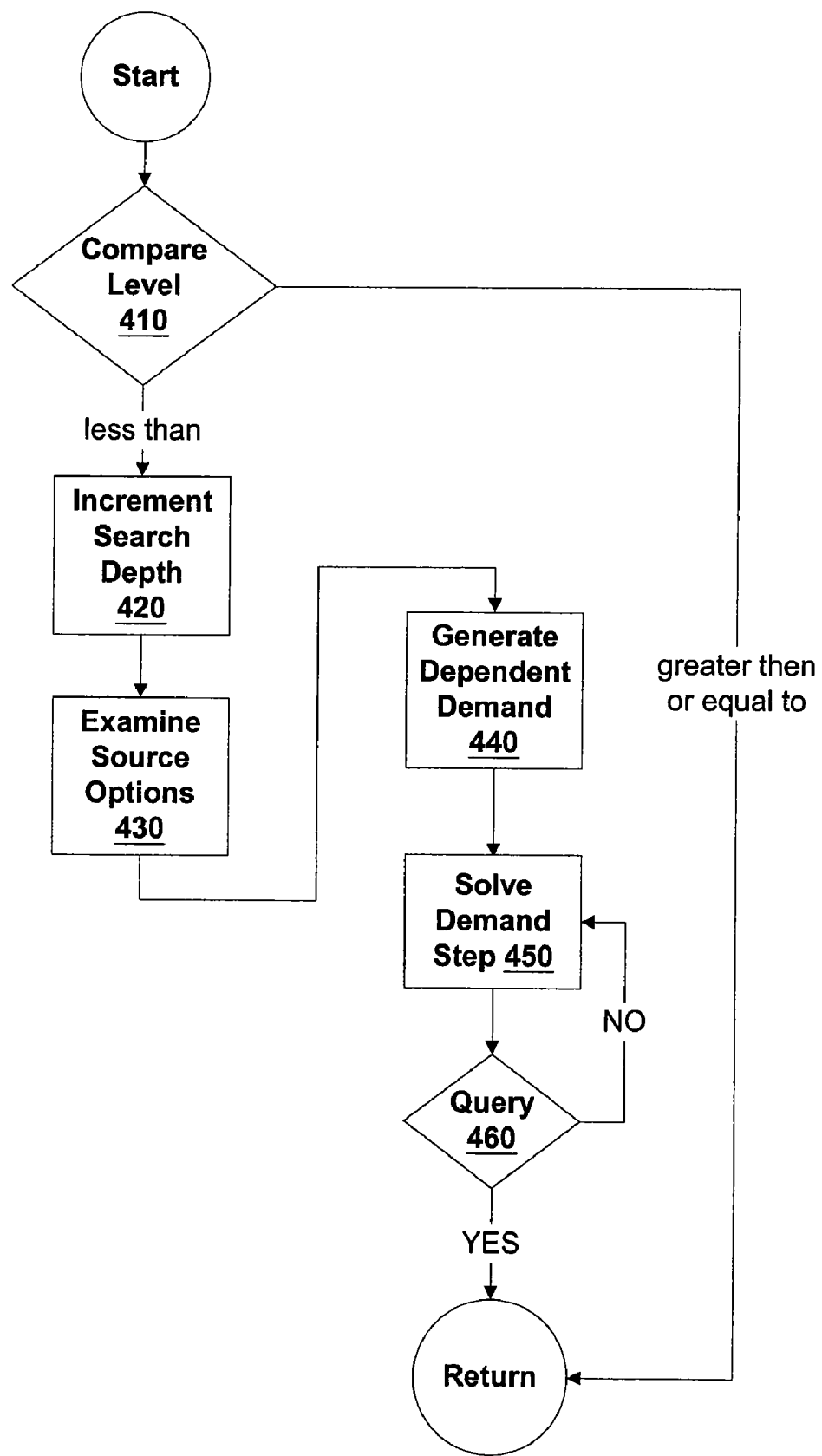
FIG. 4 is a flow diagram illustrating a method of generating a supply for an item of interest according to various embodiments of the invention.

In Create Supply Step 345, the creation of additional supply, using items at higher level codes, is considered in the search for a feasible plan. In some embodiments, Create Supply Step 345 includes a recursive execution of the method illustrated in FIG. 3. The execution is recursive in that execution of the method includes a call to itself. For example, as discussed further herein, execution of Create Supply Step 345 can include a step, similar to Solve Demand Step 230 that, in turn, includes another execution of Create Supply Step 345. Further details of Create Supply Step 345 are illustrated in FIG. 4. A Query Step 350 is used to determine if enough supply has been created in Create Supply Step 345 for the shortage to be zero. If so, then the method returns to the step that initiated the process of FIG. 3. If not, then the method proceeds to an optional Reallocate Step 355.

Figure 5:
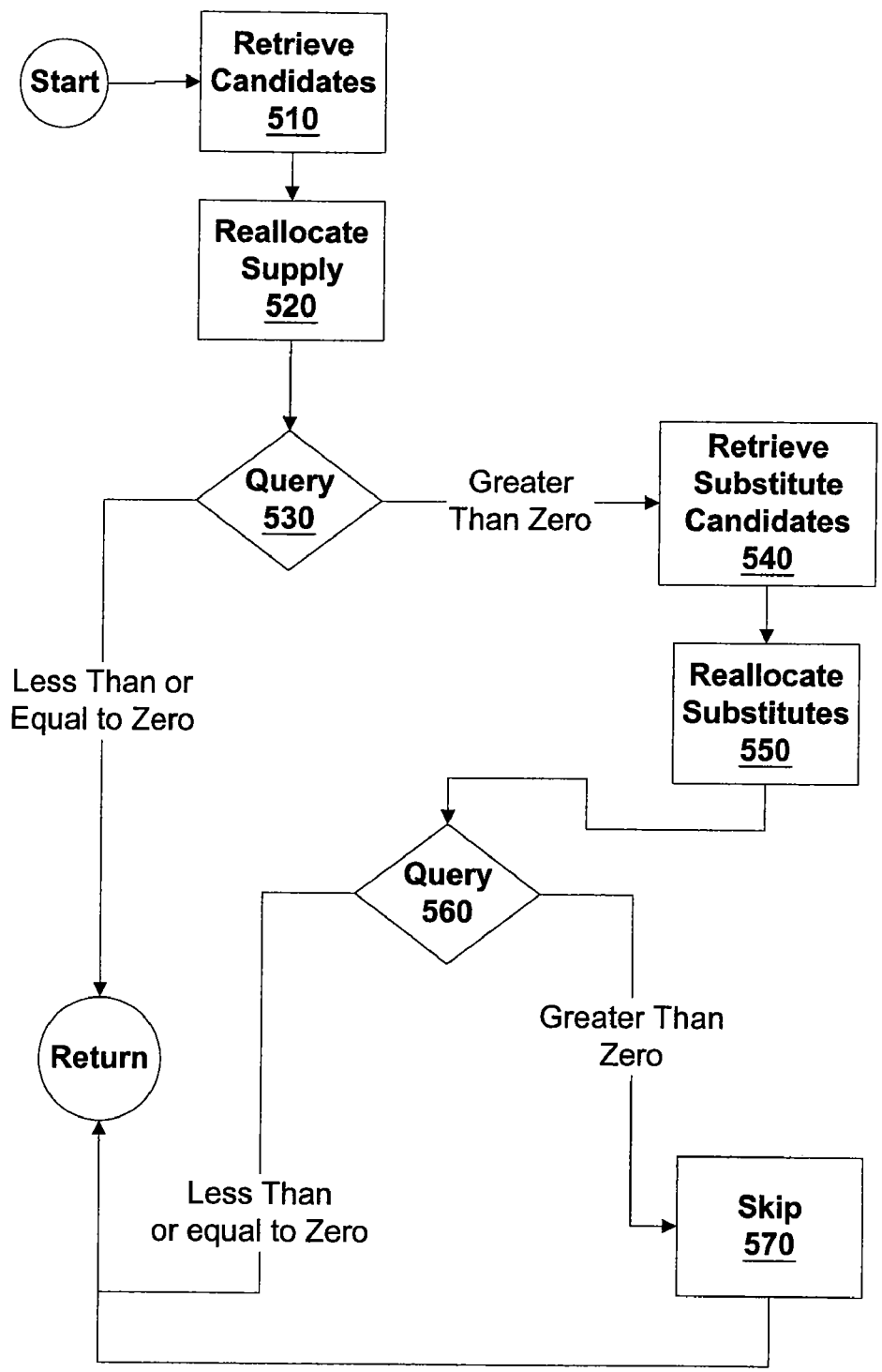
FIG. 5 is a flow diagram illustrating a method of reallocating supplies according to various embodiments of the invention.

In Reallocate Step 355, previously pegged supply is optionally reallocated to solve the current demand (e.g., the demand retrieved in Select Demand Step 310). In various embodiments, Reallocate Step 335 is responsive to a set of rules and/or a mathematical optimization routine. Further details of Reallocate Step 355 are illustrated in FIG. 5.

FIG. 4 is a flow diagram illustrating a method of generating a supply for an item of interest according to various embodiments of the invention. This method is included in some embodiments of Create Supply Step 345 and is configured to create supply using a depth search for required components. In a Compare Level Step 410 the level code of the item of interest is compared with a maximum search depth. The maximum search depth is optionally set using the maximum level code determined in Determine Level Codes Step 210 (FIG. 2). If the level code of the required item is equal to the maximum search depth, then the method returns to the step that initiated the process of FIG. 4. Typically this step will be Create Supply Step 345 (FIG. 3). If the current search depth is less than the maximum search depth then the current search depth is incremented in an Increment Search Depth Step 420.

In an Examine Source Options Step 430, possible sources for each item required to generate the item of interest are considered. In various embodiments, these required items include materials, time, labor, or the like. The required items are determined using data, such as bill of materials data, supplier data, etcetera, included in Item Definition 160 (FIG. 1). The possible sources include, for example, suppliers from which an item can be purchased, alternative items, creation of supply, reallocation of supply, transfer of supply, or the like.

In a Generate Dependent Demand Step 440, a dependent demand is generated for each item required to create the item of interest. When all of these dependent demands are satisfied, new supply for the item of interest is made available. The generated demands are optionally assigned a priority to reflect an importance of their being satisfied. In addition, each of the generated demands can be associated with a different approach to satisfaction responsive to the possible sources considered in Examine Source Options Step 430. For example, a demand may require that supply only be obtained from a specific source. A demand may require that supply be selected using a mathematical optimization routine. A demand may require that supply be created.

In a Solve Demand Step 450, an attempt is made to resolve one of the demands created in Generate Dependent Demand Step 440. In a typical embodiment, Solve Demand Step 450 includes the methods illustrated in FIG. 3. The steps illustrated in FIG. 3 are performed responsive to the sources considered in Examine Source Options Step 430. For example, if substitutes are not a possible source of supply, as determined in Examine Source Options Step 430, then Search for Substitutes Step 335 and Query Step 340 are skipped. In other examples, if supply can only be created, then Steps 325 through 340 are skipped, or if supply can only be purchased, then Steps 335 through 350 are skipped. In alternative embodiments, or for specific demands, Solve Demand Step 450 includes use of other supply management systems, use of required supply sources, or the like.

A Query Step 460 is used to determine if Solve Demand Step 450 has been executed for all of the demands generated in Generate Dependent Demand Step 440. If not, then the method returns to Solve Demand Step 450 for an attempt to satisfy another of the demands. If so, then the method returns to the process that initiated the method of FIG. 4.

FIG. 5 is a flow diagram illustrating a method of reallocating supplies according to various embodiments of the invention. This method is included in some embodiments of Reallocate Step 355 (FIG. 3). Reallocation of supplies includes identifying supply that has already been pegged to satisfy a demand and reallocating this supply to satisfy a different demand (the current demand). In a Retrieve Candidates Step 510, a list of candidate supplies for reallocation is generated using Supply Data 170 (FIG. 1). In various embodiments, this list includes supplies pegged to satisfy lower priority demands and is optionally ordered by availability date, proximity and/or quantity. In some embodiments, candidate supplies include supplies from a level code different than the level code of the item associated with the current demand.

In a Reallocate Supply Step 520, supply is reallocated from candidates in the list of alternative supplies generated in Retrieve Candidates Step 510, to the current demand if possible. Reallocation is optionally responsive to mathematical optimization routines and/or reallocation rules selected by a user. In a Query Step 530 the remaining shortage is examined. If this shortage is zero or less then the method returns to the process from which it was called. If the shortage is still greater than zero then the method proceeds to an optional Retrieve Substitute Candidates Step 540.

In Retrieve Substitute Candidates Step 540, a list of candidate substitute supplies for reallocation is generated. These supplies include substitute items that can be used in place of the item indicated by the current demand. Possible substitute items are typically identified in Item Definition 160 (FIG. 1).

In a Reallocate Substitutes Step 550, supply of substitute items is reallocated, from candidates in the list generated in Retrieve Substitute Candidates Step, to the current demand, if possible. As in Reallocate Supply Step 520, reallocation in Reallocate Substitutes Step 550 is optionally responsive to optimization routines and/or user criteria. In a Query Step 560 the remaining shortage is examined. If the shortage is zero or less, then the method returns to the calling process. If the shortage is not zero, then Skip Step 570 is used to set data indicating that the attempt to satisfy the demand failed and that a feasible plan may not be found. The method then returns to the calling process.

In alternative embodiments of the methods illustrated by FIG. 5, Retrieve Candidates Step 510 and Retrieve Substitute Candidates Step 540 are combined. In these embodiments, the candidates are optionally ordered responsive to user selected parameters, optimization routines, priority, or the like. Reallocate Supply Step 520 and Reallocate Substitutes Step 550 are then combined such that both types of candidates are reallocated in a single step.

In various embodiments of the invention a user can direct behavior of the system by selecting preferences. For example, in some embodiments, a user can enable or disable reallocation or substitution. In some embodiments reallocation and/or substitution are only allowed under certain conditions, such as when attempting to shorten a time required to execute a feasible plan. In some embodiments, a user can select which supply options are used to shorten an already feasible plan. Some embodiments of the invention allow a user to expand or minimize safety supply. Safety supply is supply that is kept in reserve in case of disruptions in delivery or the like. A minimized safety supply is used in just-in-time inventory systems.

Several embodiments are specifically illustrated and/or described herein. However, it will be appreciated that modifications and variations are covered by the above teachings and within the scope of the appended claims without departing from the spirit and intended scope thereof. For example, aspects of the invention may be applied to project management and scheduling of tasks. Demand may be for human resources, and capacity, as well as supplies.

What is claimed is:

1. A computing system for determining a feasible supply plan, the system including:

a data storage, the data storage being configured to store a plurality of item definitions, a plurality of demand data, and a plurality of supply data, the plurality of item definitions including component data configured for the generation of dependent demands, the generation occurring during satisfaction of demands for items defined by the item definitions; and a processor configured to access the data storage and:
collect the plurality of demand data; and
for each demand in the plurality of demand data:
search the data storage for a supply of an item to satisfy the demand;
allocate the supply to the demand;
determine if the allocated supply satisfies the demand; and
search the data storage for an alternate source of an item to satisfy the demand if the demand is not satisfied,
wherein the alternate source is configured to satisfy demands associated with level codes higher than a current level code associated with the demand.

2. The computing system of claim 1, wherein the item definitions include data configured to identify substitutes for an item.

3. The computing system of claim 1, wherein the dependent demands are for items associated with a level code greater than zero.

4. The computing system of claim 1, wherein the dependent demands are associated with priorities responsive to the plurality of demand data.

5. A computer-implemented method for determining a feasible supply plan, the method comprising:

storing, by a computer system in a data storage, a plurality of item definitions, a plurality of demand data, and a plurality of supply data, the plurality of item definitions including component data configured for the generation of dependent demands, the generation occurring during satisfaction of demands for items defined by the item definitions;
collecting, by the computer system, the plurality of demand data; and
for each demand in the plurality of demand data:
searching, by the computer system, the data storage for a supply of an item to satisfy the demand;
allocating, by the computer system, the supply to the demand;
determining, by the computer system, if the allocated supply satisfies the demand; and
searching, by the computer system, the data storage for an alternate source of an item to satisfy the demand if the demand is not satisfied,
wherein the alternate source is configured to satisfy demands associated with level codes higher than a current level code associated with the demand.

6. The method of claim 5, wherein the item definitions include data configured to identify substitutes for an item.

7. The method of claim 5, wherein the dependent demands are for items associated with a level code greater than zero.

8. The method of claim 5, wherein the dependent demands are associated with priorities responsive to the plurality of demand data.

9. A non-transitory machine-readable medium for a computer system, the non-transitory machine-readable medium having stored thereon a series of instructions executable by a processor for determining a feasible supply plan, the series of instructions comprising:

instructions that cause the processor to store, in a data storage, a plurality of item definitions, a plurality of demand data, and a plurality of supply data, the plurality of item definitions including component data configured for the generation of dependent demands, the generation occurring during satisfaction of demands for items defined by the item definitions;

instructions that cause the processor to collect the plurality of demand data; and instructions that cause the processor, for each demand in the plurality of demand data, to do the following:
 search the data storage for a supply of an item to satisfy the demand;
 allocate the supply to the demand;
 determine if the allocated supply satisfies the demand; and
 search the data storage for an alternate source of an item to satisfy the demand if the demand is not satisfied,
 wherein the alternate source is configured to satisfy demands associated with level codes higher than a current level code associated with the demand.

10. The machine-readable medium of claim 9, wherein the item definitions include data configured to identify substitutes for an item.

11. The machine-readable medium of claim 9, wherein the dependent demands are for items associated with a level code greater than zero.

12. The machine-readable medium of claim 9, wherein the dependent demands are associated with priorities responsive to the plurality of demand data.

* * * * *

UNITED STATES PATENT AND TRADEMARK OFFICE
CERTIFICATE OF CORRECTION

Page 1 of 1

PATENT NO.       : 8,121,885 B2
APPLICATION NO.  : 12/422515
DATED            : February 21, 2012
INVENTOR(S)      : Nephew et al.

It is certified that error appears in the above-identified patent and that said Letters Patent is hereby corrected as shown below:

On front page, in column 2, under "Other Publications", line 5, delete "timeperformance" and insert -- time performance --, therefor.

On sheet 4 of 5, in figure 4, Adjacent to Box No. 440, line 1, delete "then" and insert -- than --, therefor.

Signed and Sealed this
Fifteenth Day of May, 2012

David J. Kappos
*Director of the United States Patent and Trademark Office*